United States Patent
Hsu et al.

(10) Patent No.: US 6,836,034 B2
(45) Date of Patent: Dec. 28, 2004

(54) NON-BIASING GUIDING MECHANISM

(75) Inventors: Kuo-Tung Hsu, Taoyuan (TW); Chun-Hua Yang, Taipei (TW); Jiun-Ying Lin, Yunlin (TW); Hou-Chu Chen, Taipei (TW); Ko-Chien Lin, Ilan (TW); Wen-Shi Huang, Taoyuan (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 0 days.

(21) Appl. No.: 10/348,180

(22) Filed: Jan. 22, 2003

(65) Prior Publication Data

US 2004/0075354 A1 Apr. 22, 2004

(30) Foreign Application Priority Data

Oct. 22, 2002 (TW) ...................................... 91216850 U

(51) Int. Cl.⁷ .............................. H02K 5/16; H02K 7/08
(52) U.S. Cl. ................. 310/49 R; 310/90; 310/40 MM
(58) Field of Search ........................ 310/49 R, 40 MM, 310/90, 257, 208, 194, 43, 91, 268; 29/596–598

(56) References Cited

U.S. PATENT DOCUMENTS

| | | | | |
|---|---|---|---|---|
| 4,703,243 A | * | 10/1987 | Ettelman et al. ............ | 318/696 |
| 4,841,190 A | * | 6/1989 | Matsushita et al. ......... | 310/257 |
| 5,651,206 A | * | 7/1997 | Matarazzo ................. | 42/70.08 |
| 5,798,592 A | * | 8/1998 | Peterson .................... | 310/164 |
| 5,811,903 A | * | 9/1998 | Ueno et al. .................. | 310/90 |
| 6,255,749 B1 | * | 7/2001 | Aoshima et al. .......... | 310/49 R |
| 6,541,886 B2 | * | 4/2003 | Mayumi ..................... | 310/91 |

FOREIGN PATENT DOCUMENTS

JP 63-7150 * 1/1988 .................. 310/90

* cited by examiner

*Primary Examiner*—Dang Le
*Assistant Examiner*—Leda Pham
(74) *Attorney, Agent, or Firm*—Birch, Stewart, Kolasch & Birch, LLP

(57) ABSTRACT

The non-biasing guiding mechanism related to CD-R drives is used to drive a data access device to move along a particular direction and to access the data on a CD. The shaft of the non-biasing guiding mechanism is fixed by an axis-fixing member. The axis-fixing member has ring parts on the opposite ends and a receiver integrally formed with the ring part in a concentric way. The ring part is coiled by a coil and sets inside the drive, and the hole is used for positioning the shaft and sets outside the drive. Therefore, the biasing problem of the shaft can be solved by using the axis-fixing member.

14 Claims, 5 Drawing Sheets

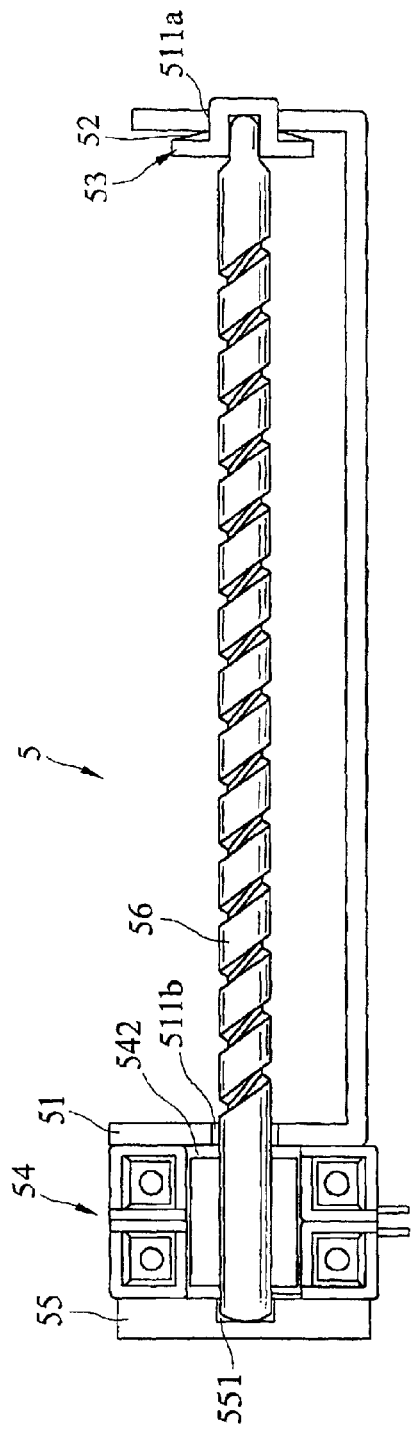
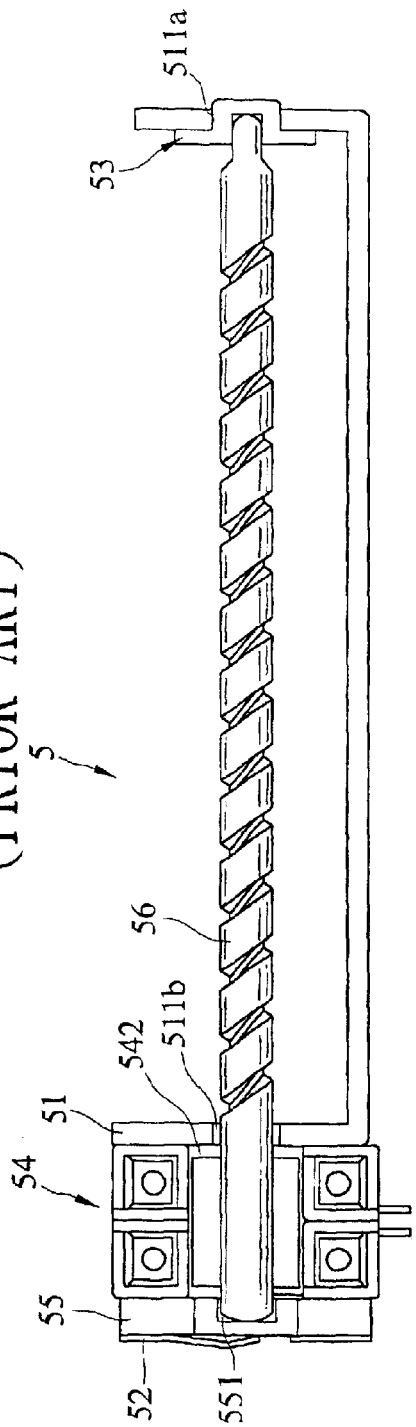
FIG. 2 (PRIOR ART)
FIG. 3 (PRIOR ART)

US 6,836,034 B2

NON-BIASING GUIDING MECHANISM

This nonprovisional application claims priority under 35 U.S.C. § 119(a) on Patent Application No. 091216850 filed in TAIWAN, R.O.C. on Oct. 22, 2002, which is herein incorporated by reference.

BACKGROUND OF THE INVENTION

1. Field of Invention

The present invention relates to a guiding mechanism, and more particularly, to a non-biasing guiding mechanism used in a CD-R drive to drive a data access device to move along a specific direction for accessing data on a CD.

2. Related Art

Please refer to FIG. 1. FIG. 1 shows a schematic view of an inner portion of an optical disk drive according to the prior art. The optical disk drive includes a carrier 1, a data access device 2 (including an optical pickup head and objective lens), and a guiding mechanism 5. The carrier 1 is used to support an optical disk. The data access device 2 can read and write data on the optical disk. The guiding mechanism 5 is used to guide the data access device 2 to move along a specific direction for accessing data on the optical disk.

Please refer to FIG. 2, FIG. 3 and FIG. 4, which show cross-sectional views of different types of guiding mechanisms according to the prior art. A first conventional guiding mechanism shown in FIG. 2 includes a supportive chassis 51, an elastic component 52, a first positioning element 53, a driver 54, a second positioning element 55, and a shaft 56. Two ends of the supportive chassis 51 are respectively formed with openings 511a, 511b. The elastic component 52 has a hole corresponding to the opening 511a so that the first positioning element 53 can go through the hole of the elastic component 52 to reach the opening 511a and be elastically supported by the elastic component 52.

The driver 54, such as a rotation motor, installed on the supportive chassis 51 has a through hole 542 corresponding to the opening 511b. The second positioning element 55 installed opposite to the through hole 542 has a slot 551. Therefore, one end of the shaft 56 can be fixed inside the first positioning element 53, while the other penetrates through the opening 511b of the supportive chassis 51 and the through hole 542 of the driver 54, and is fixed inside the slot 551 of the second positioning element 55.

With the above setup, the data access device 2 is forced to move along the direction guided by the shaft 56, accessing data on the optical disk conveyed by the carrier 1. However, in the first guiding mechanism 5, the driver 54 and the supportive chassis 51 as well as the driver 54 and the second positioning element 55 are fixed by welding or screws. This structure is likely to make the shaft 56 deviate from the center, causing difficulty in data reading or writing.

A second conventional guiding mechanism 5 is shown in FIG. 3. The above-mentioned elastic component 52 is provided at the second positioning element 55. Its function is still to put a pressure on the shaft 56 so that the shaft 56 is not able to make an axial displacement. This structure, however, is still not able to improve the deviation problem of the shaft 56. A third conventional guiding mechanism 5 shown in FIG. 4 also has the same problem.

In view of the foregoing, it is desirable to provide a non-biasing guiding mechanism so that the data access device of the optical disk drive can move along a specific direction for smoothly retrieving data in the optical disk supported by the carrier.

SUMMARY OF THE INVENTION

A primary objective of the invention is to provide a non-biasing guiding mechanism so that the data access device of the optical disk drive can move along a specific direction for smoothly retrieving data in the optical disk supported by the carrier.

The disclosed guiding mechanism is used to make an object move along a specific direction. The guiding mechanism mainly includes a driver, a shaft chassis, and a shaft. The driver is installed on one end of the shaft chassis and has an axis-fixing member. The axis-fixing member has ring parts on the opposite ends and a hole formed in a concentric way with the ring part in a unitized shape. The ring part is coiled by a coil and sets inside the drive, and the hole is installed outside the drive. The shaft is installed on the shaft chassis, with one end penetrating through the shaft chassis and installed at the axis-fixing member.

Consequently, the invention uses the driver to drive the shaft and the object thereon to move along the shaft direction. The axis-fixing member installed on the driver restricts the shaft from having axial displacement. Therefore, the shaft axial problems happening in the conventional technology is solved.

BRIEF DESCRIPTION OF THE DRAWINGS

The invention will become more fully understood from the detailed description given hereinbelow illustration only, and thus are not limitative of the present invention, and wherein:

FIG. 2 is a cross-sectional view of a first guiding mechanism according to the prior art;

FIG. 3 is a cross-sectional view of a second guiding mechanism according to the prior art;

DETAILED DESCRIPTION OF THE INVENTION

Figure 5:
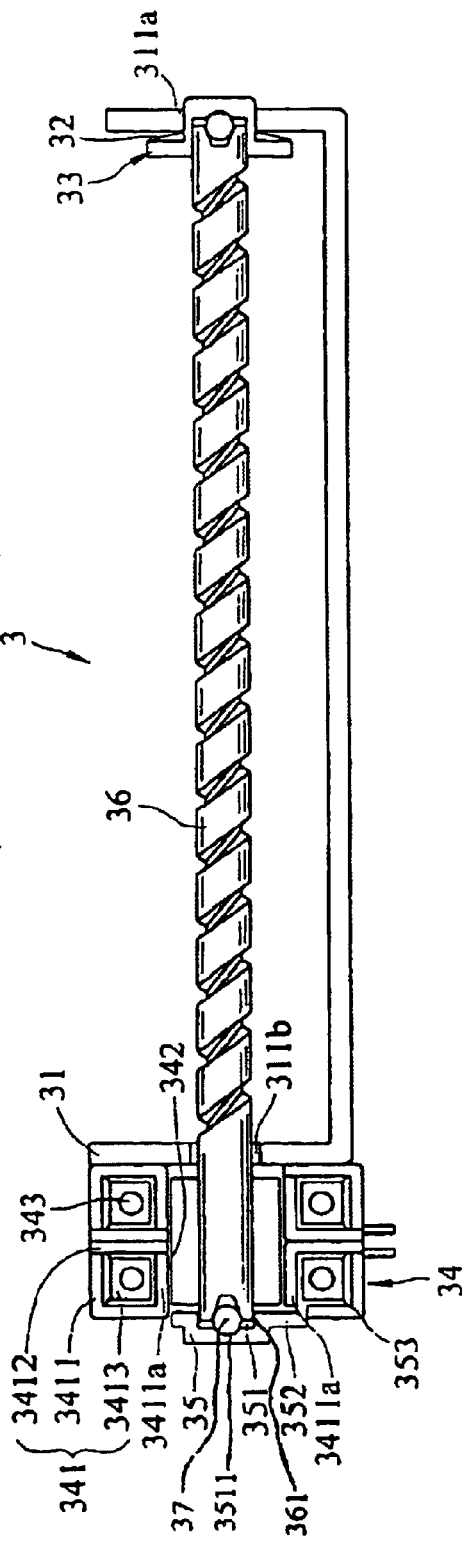
FIG. 5 is a cross-sectional view of the present invention.
Figure 6B:
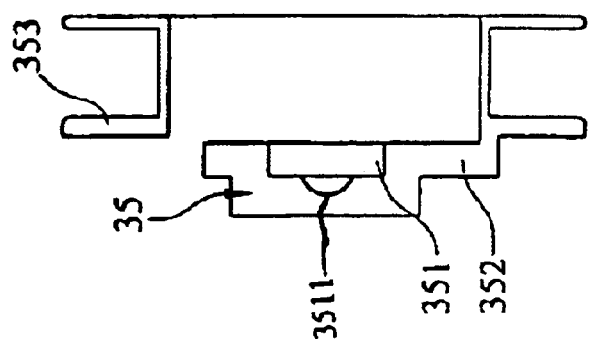
FIGS. 6A and 6B are front and cross-sectional views of the second axis-fixing member according to the present invention.
Figure 6A:
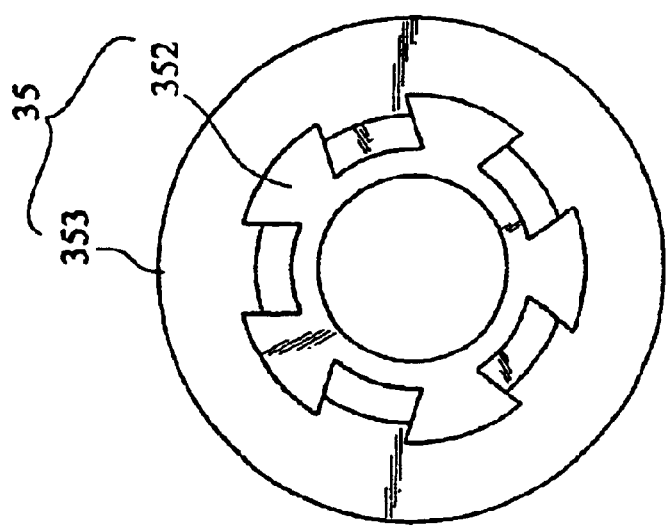

As shown in FIGS. 5, 6A, and 6B, the non-biasing guiding mechanism 3 disclosed in the invention is used to make an object move in a specific direction. The guiding mechanism 3 includes a shaft chassis 31, an elastic element 32, a first axis-fixing member 33, a driver 34, and a shaft 36.

Figure 1:
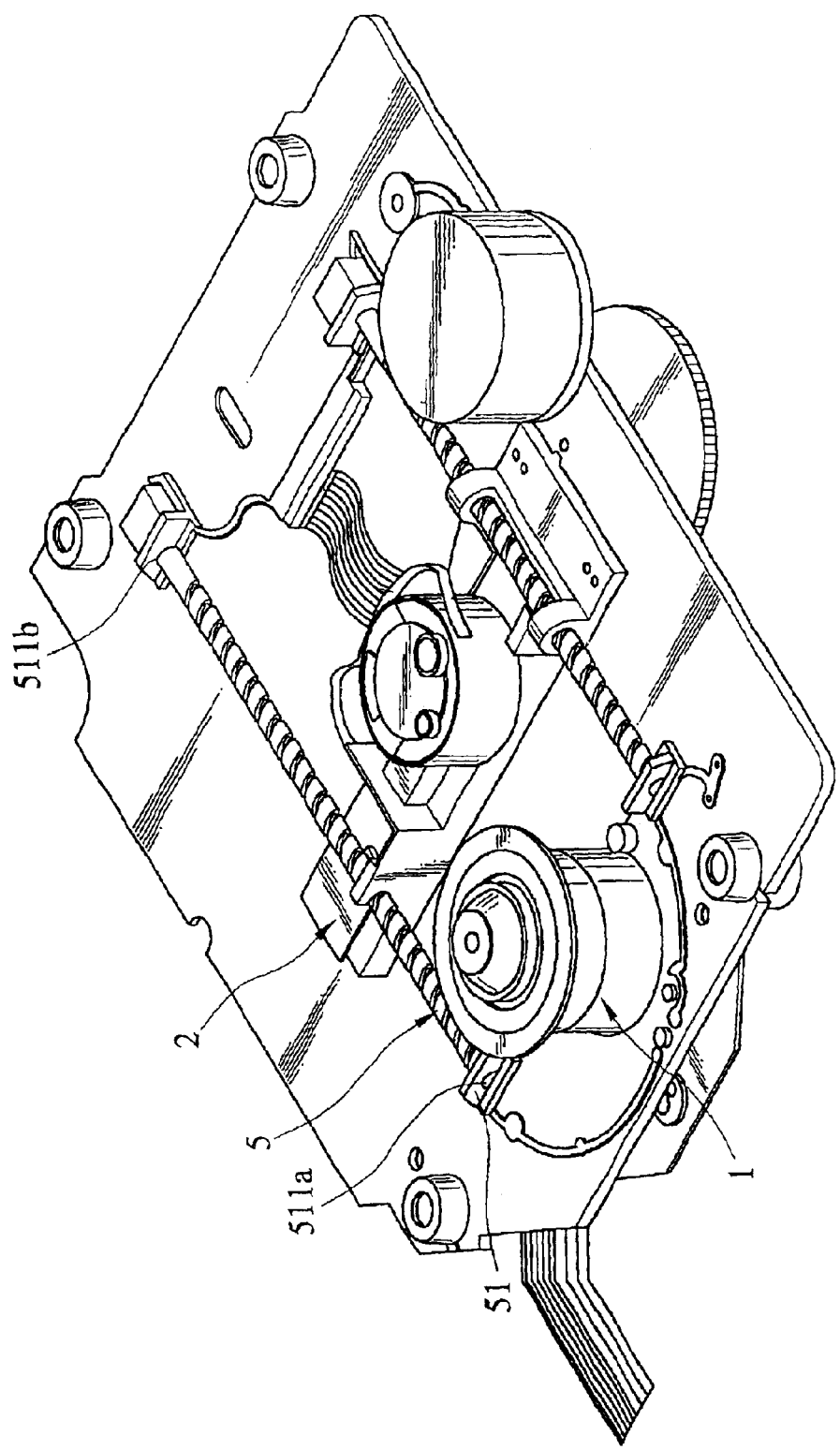
FIG. 1 is a three-dimensional view of the layout of a CD-R drive according to the prior art.
Figure 4:
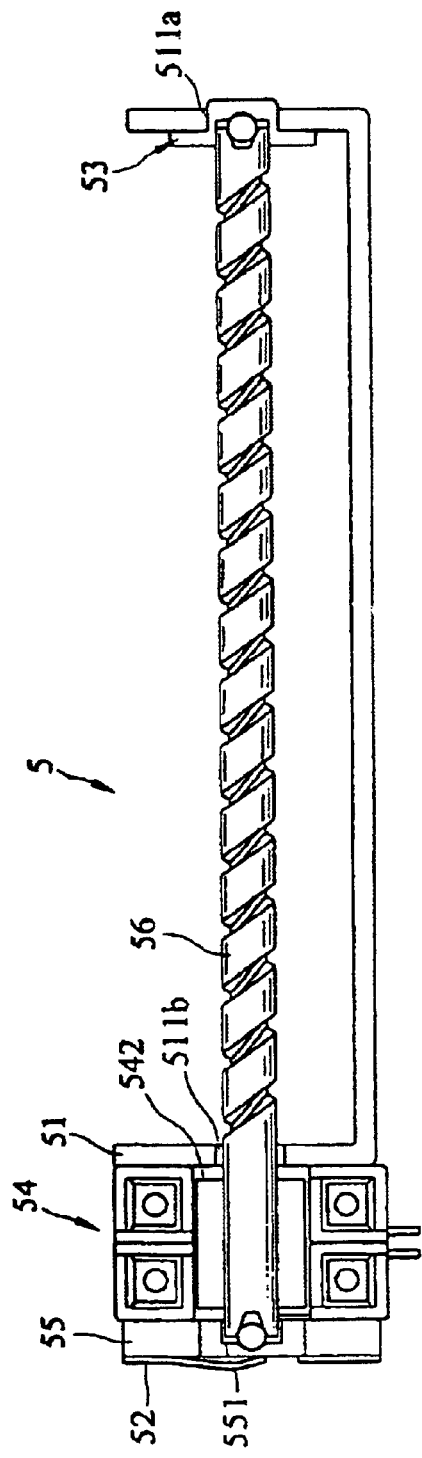
FIG. 4 is a cross-sectional view of a third guiding mechanism according to the prior art.

Both ends of the shaft chassis 31 are formed with a first opening 311a and a second opening 311b. Of course, as shown in FIG. 1, another embodiment of the shaft chassis 31 is that both sides of the shaft chassis 31 are formed with a first opening 311a and a second opening 311b, respectively, for the installation of the shaft 36.

The elastic element 32 has a hole corresponding to the first opening 311a so as to be installed on the shaft chassis 31.

The first axis-fixing member 33 goes through the hole of the elastic element 32 and fixes on the first opening 311a. It depresses the elastic element 32, which in turn exerts a restoring force on the first axis-fixing member 33.

The driver 34 is preferably a rotational motor adapted to be used with the shaft and installed on the outer side of the second opening 311b of the shaft chassis 31 for driving the shaft 36 to rotate. The driver 34 includes a casing 341, a through hole 342, a coil 343, and a second axis-fixing member 35 made of a plastic material. The casing 341 is the stator of the driver 34. It has an internal space 3413 formed by a container 3411 and a cover 3412. The container 3411 and the cover 3412 are combined via a claw part 3411a on both of them. After the combination, the inner rim of the claw part 3411a forms the through hole 342 corresponding to of the second opening 311b. The coil 343 is coiled on the ring part 353 on one end of the second axis-fixing member 35. The coil 343 and the ring part 353 on one end of the second axis-fixing member 35 are disposed inside the internal space 3414 (i.e. inside the driver 34). The other end of the second axis-fixing member 35 is a receiver 351, which connects the ring part 353 through a rib part 352. It is further integrally formed with the ring part 353 in a concentric way to prevent the shaft from axial displacements. The receiver 351 corresponds to and faces the second opening 311b. The receiver has a first notch 3511 facing the second opening. The second axis-fixing member has a second notch 361 corresponding to the first notch for receiving a positioning ball therebetween. Therefore, the claw part 3411a can go through the two rib parts 352 of the second axis-fixing member 35, so that the hole 351 of the second axis-fixing member 35 protrudes from the through hole 342 to the exterior of the driver 34.

One end of the shaft 36 is fixed inside the first axis-fixing member 33. The other end goes through the second opening 311b of the shaft chassis 31 and the through hole 342 of the driver 34, and fixes in the receiver 351 of the second axis-fixing member 35. Under the force of the elastic element 32, the shaft 36 does not have axial displacement, bring the object on the shaft 36 into motion.

When in use, the driver 34 drives the shaft 36, which moves other objects installed thereon. Of course, when applying the invention to an optical disk drive, the object installed on the shaft 36 is the data access device 2 of the disk drive (see FIG. 1). Thus, the driver 34 can control the data access device 2 to read data from a CD.

Figure 7:
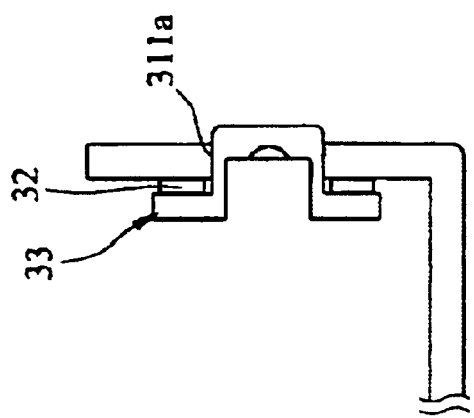
FIG. 7 is a cross-sectional view of an elastic element according to the second embodiment of the present invention.

In addition to the first embodiment described above, the elastic element 32 can be modified as the second embodiment shown in FIG. 7. That is, the elastic element 32 can be substituted by a soft pad installed near the first opening 311a of the shaft chassis 31. After finishing the assembly of the invention, the elastic element 32 has a direct contact with the first axis-fixing member 33. When the elastic element 32 is depressed, a restoring force is imposed on the first axis-fixing member 33 to push the shaft 36 so that the shaft does not have axial displacement.

Figure 9B:
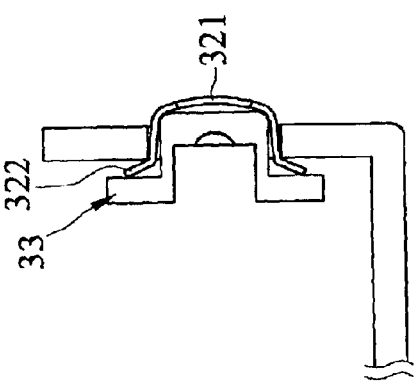
FIGS. 9A and 9B are cross-sectional views of the elastic element depicted in FIG. 8 when it is installed.
Figure 9A:
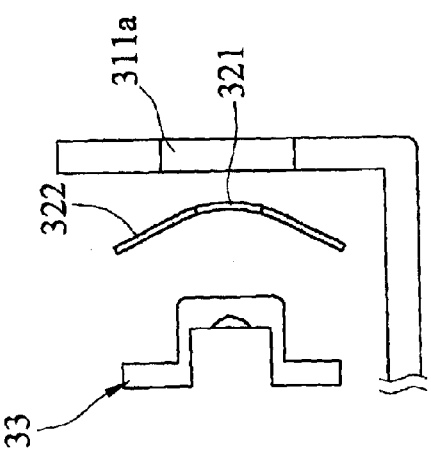
Figure 8:
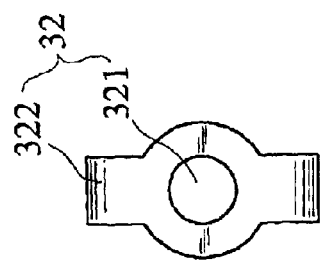
FIG. 8 is a cross-sectional view of an elastic element according to the third embodiment of the present invention.

FIGS. 8, 9A, and 9B show the third embodiment of the elastic element 32 and its installation. The elastic element 32 has a ring part 321 and depressing parts 322 on opposite sides of the ring part 321. The ring part 321 corresponds to the first opening 311a. Therefore, when the elastic element 32 is pushed into the first opening 311a, it has a pressure on the first axis-fixing member 33 and keeps the depressing 322 outside the first opening 311a.

When the first axis-fixing member 33 is pushed into the first opening 311a, the elastic element 32 is pushed so that the depressing parts 322 enter the first opening 311a. However, due to the elasticity of the elastic element 32, a restoring force toward the first axis-fixing member 33 is generated to constrain the shaft 36 so that no axial displacement is possible.

Figure 10:
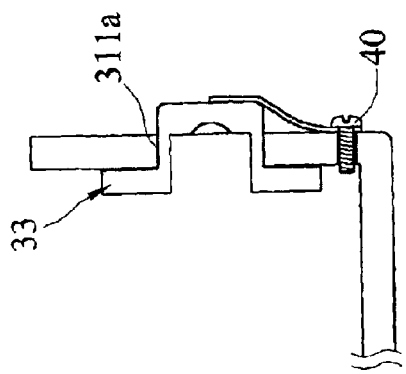
FIG. 10 is a cross-sectional view of an elastic element according to the fourth embodiment of the present invention.

As shown in FIG. 10, a fourth embodiment of the elastic element 32 mainly has a fixing element 40. One end of the elastic element 32 is an elastic chip installed at a place corresponding to the first opening 311a. When the first axis-fixing member 33 is disposed at the first opening 311a, the elastic element is forced to depart from the first opening 311a. Similarly, the elastic element 32 also generates a restoring force on the first axis-fixing member 33. The shaft 36 is thus prevented from axial displacements.

Effects of the Invention

The invention discloses a non-biasing guiding mechanism for the data access device of an optical disk drive to move along a specific direction and to access data on an optical disk drive supported by the carrier. The ring part of a second axis-fixing member and a receiver integrally formed with the ring parts in a concentric way are used to prevent the shaft from axial displacements. This completely solves the shaft biasing problem happening in the prior art (where the axis-fixing member and the driver are combined by welding or using screws).

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A non-biasing guiding mechanism for an object to move along a specific direction, the guiding mechanism comprising:

a shaft chassis having a first opening and a second opening;

an elastic element disposed on the shaft chassis and corresponding to the first opening;

a first axis-fixing member installed on the first opening and depressing the elastic element;

a driver installed on the outer side of the second opening of the shaft chassis comprising a through hole corresponding to the second opening and a second axis-fixing member having a ring part formed inside the driver for coiling and a receiver integrally formed with the ring part in a concentric manner, the receiver having a first notch facing the second opening; and a shaft having one end installed inside the first axis-fixing member and the other end installed inside the receiver of the second axis-fixing member and having a second notch corresponding to the first notch for receiving a positioning ball therebetween;

wherein when the receiver is depressed by the elastic element, the shaft drives the object to move along the specific direction without axial displacements.

2. The non-biasing mechanism of claim 1, wherein the second axis-fixing member is made of plastic material.

3. The non-biasing guiding mechanism of claim 1, wherein the driver, which is a rotation motor, further comprises a casing having an accommodation space for receiving the second axis-fixing member.

4. The non-biasing guiding mechanism of claim 3, wherein the casing comprises a container and a cover for forming the accommodation space of the casing therein, the inner rims of the container and the cover are individually formed with a plurality of claw parts for combination.

5. The non-biasing mechanism of claim 4, wherein the second axis-fixing member has a plurality of rib parts for connecting the receiver and the ring parts, the claw part goes through the rib parts so that the receiver of the second axis-fixing member is protruded outside the driver.

6. The non-biasing guiding mechanism of claim 1, wherein the elastic element has a hole corresponding to the first opening for enabling the first axis-fixing member to go through the hole so as to be fixed at the first opening, and exerts a restoring force on the first axis-fixing member when it is depressed.

7. The non-biasing guiding mechanism of claim 1, wherein the elastic element is a soft pad.

8. The non-biasing guiding mechanism of claim 6, wherein the first axis-fixing member is placed inside the first opening, the elastic element is depressed and part of the elastic element is squeezed into the first opening.

9. The non-biasing guiding mechanism of claim 8, wherein the elastic element has a ring part corresponding to the first opening and two depressing parts on opposite ends of the ring part so that the elastic element depresses the first axis-fixing member and pushes the depressing part; to the outer part of the first opening when it is squeezed into the first opening.

10. The non-biasing guiding mechanism of claim 1, wherein the elastic element is a spring plate which has one end fixed at the first opening by using a fixing element, the elastic element is forced to move away from the first opening when the first axis-fixing member is disposed at the first opening and, at the same time, the elastic plate exerts a restoring force on the first axis-fixing member, preventing the shaft from axial displacements.

11. A motor structure adapted to be used with a shaft comprising:
   an axis-fixing member having a ring part for coiling and a receiver integrally formed with the ring part in a concentric manner to prevent the shaft from axial displacements; and
   a casing having an accommodation space for coiling and installing a ring part of the axis-fixing member and a through hole for providing the receiver of the axis-fixing member to be protruded from the casing, the receiver facing the through hole.

12. The motor structure of claim 11, wherein the casing comprises a container and a cover for forming the accommodation space of the casing therein, the inner rims of the container and the cover are individually formed with a plurality of claw parts for combination.

13. The motor structure of claim 12, wherein the axis-fixing member has a plurality of rib parts for connecting the receiver and the ring parts, the claw part goes through the rib parts so that the receiver of the axis-fixing member is protruded outside the driver.

14. The motor structure of claim 11, wherein the casing is a stator of the motor structure.

* * * * *